(12) United States Patent
Morimoto et al.

(10) Patent No.: US 9,919,731 B2
(45) Date of Patent: Mar. 20, 2018

(54) VEHICLE

(71) Applicant: YAMAHA HATSUDOKI KABUSHIKI KAISHA, Iwata-shi, Shizuoka (JP)

(72) Inventors: Takahiro Morimoto, Shizuoka (JP); Kazuo Sunahiro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/941,852

(22) Filed: Nov. 16, 2015

(65) Prior Publication Data

US 2016/0152135 A1 Jun. 2, 2016

(30) Foreign Application Priority Data

Nov. 28, 2014 (JP) ................................. 2014-242313

(51) Int. Cl.
| | |
|---|---|
| *B62D 5/00* | (2006.01) |
| *B60W 10/06* | (2006.01) |
| *B60W 10/10* | (2012.01) |
| *B60W 10/20* | (2006.01) |
| *B60W 50/00* | (2006.01) |

(52) U.S. Cl.
CPC ............... *B62D 5/00* (2013.01); *B60W 10/06* (2013.01); *B60W 10/10* (2013.01); *B60W 10/20* (2013.01); *B60W 50/00* (2013.01); *B60Y 2200/20* (2013.01); *B60Y 2300/432* (2013.01); *B60Y 2300/70* (2013.01)

(58) Field of Classification Search
None
See application file for complete search history.

(56) References Cited

U.S. PATENT DOCUMENTS

| | | | | |
|---|---|---|---|---|
| 5,323,667 | A * | 6/1994 | Tweed .................. | B60W 30/18 477/107 |
| 5,570,753 | A * | 11/1996 | Carlini .................. | B62K 11/04 180/219 |
| 6,257,081 | B1 * | 7/2001 | Gagnon ................ | B60W 10/02 477/63 |
| 8,177,684 | B2 * | 5/2012 | Zenno .................. | F16D 48/064 477/174 |
| 2002/0107628 | A1 * | 8/2002 | Sakakiyama .......... | B60K 23/08 701/89 |
| 2003/0234135 | A1 * | 12/2003 | Gaunt ................... | B60W 10/08 180/417 |
| 2009/0062994 | A1 * | 3/2009 | Nedachi .............. | F16H 61/0213 701/51 |

(Continued)

*Primary Examiner* — Katy M Ebner
*Assistant Examiner* — Hilary L Johns
(74) *Attorney, Agent, or Firm* — Keating and Bennett, LLP

(57) ABSTRACT

A vehicle includes a body frame, an engine, a transmission, an injector, an engine controller, and a transmission controller. The body frame supports three or more wheels. The engine is attached to the body frame. The transmission is attached to the body frame and changes a torque from the engine and outputs a resulting torque. The injector is disposed on or above the engine, and supplies fuel to the engine. The transmission controller is configured or programmed to control a gear position of the transmission. The engine controller and the transmission controller are spaced apart from each other.

18 Claims, 9 Drawing Sheets

(56) References Cited

U.S. PATENT DOCUMENTS

| | | | |
|---|---|---|---|
| 2013/0158766 A1* | 6/2013 | Okuda .................... | B60K 6/48 |
| | | | 701/22 |
| 2013/0161107 A1* | 6/2013 | Tsukamoto ............ | B62K 11/10 |
| | | | 180/220 |
| 2014/0195082 A1* | 7/2014 | Takamura ............... | B60L 11/14 |
| | | | 701/22 |
| 2014/0288763 A1* | 9/2014 | Bennett ................. | B62D 11/18 |
| | | | 701/31.6 |

* cited by examiner

VEHICLE

This application claims priority to Patent Application No. 2014-242313 filed in Japan on Nov. 28, 2014, the entire contents of which are hereby incorporated by reference.

BACKGROUND OF THE INVENTION

1. Field of the Invention

The present invention relates to vehicles suitable for traveling over rough terrain.

2. Description of the Related Art

Vehicles suitable for traveling over rough terrain are conventionally known. Among such vehicles are an all-terrain vehicle (hereinafter referred to as an "ATV") and a recreational off-highway vehicle (hereinafter referred to as an "ROV"). Some ATVs and ROVs include an electronically controlled transmission or an "automated manual transmission (AMT)" that allows gears of the transmission to be shifted by an actuator in response to a gear shifting operation performed by a driver. In such a vehicle, a control signal is provided to the actuator so as to enable the shifting of the gears. For example, U.S. Pat. No. 6,257,081 discloses a vehicle including an electric control unit (ECU) having not only an engine control function but also a transmission control function.

Unfortunately, the ECU of the above conventional vehicle is inevitably large in size, because the ECU combines the engine control function and the transmission control function. For example, vehicles of the same type may be designed to be one equipped with an AMT (hereinafter referred to as an "AMT vehicle") and one equipped with no AMT (hereinafter referred to as a "non-AMT" vehicle). In such a case, ECUs built to the same specifications are normally used in AMT and non-AMT vehicles, which means that not only the ECU of the AMT vehicle but also the ECU of the non-AMT vehicle is large in size. This complicates the layout of components, such as the ECU, in the non-AMT vehicle, and leads to an increase in cost of the non-AMT vehicle.

SUMMARY OF THE INVENTION

Accordingly, preferred embodiments of the present invention provide vehicles including controllers that are reduced in size so as to increase layout flexibility of vehicle components, regardless of the presence or absence of an AMT function.

A vehicle according to a preferred embodiment of the present invention includes a body frame, an engine, a transmission, an injector, an engine controller, and a transmission controller. The body frame supports three or more wheels. The engine is attached to the body frame. The transmission is attached to the body frame and changes a torque from the engine and outputs a resulting torque. The injector is disposed on or above the engine, and supplies fuel to the engine. The engine controller is configured or programmed to control the injector. The transmission controller is configured or programmed to control a gear position of the transmission. The engine controller and the transmission controller are spaced apart from each other.

Various preferred embodiments of the present invention provide a vehicle including controllers that are reduced in size so as to increase layout flexibility of vehicle components, regardless of the presence or absence of an AMT function.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
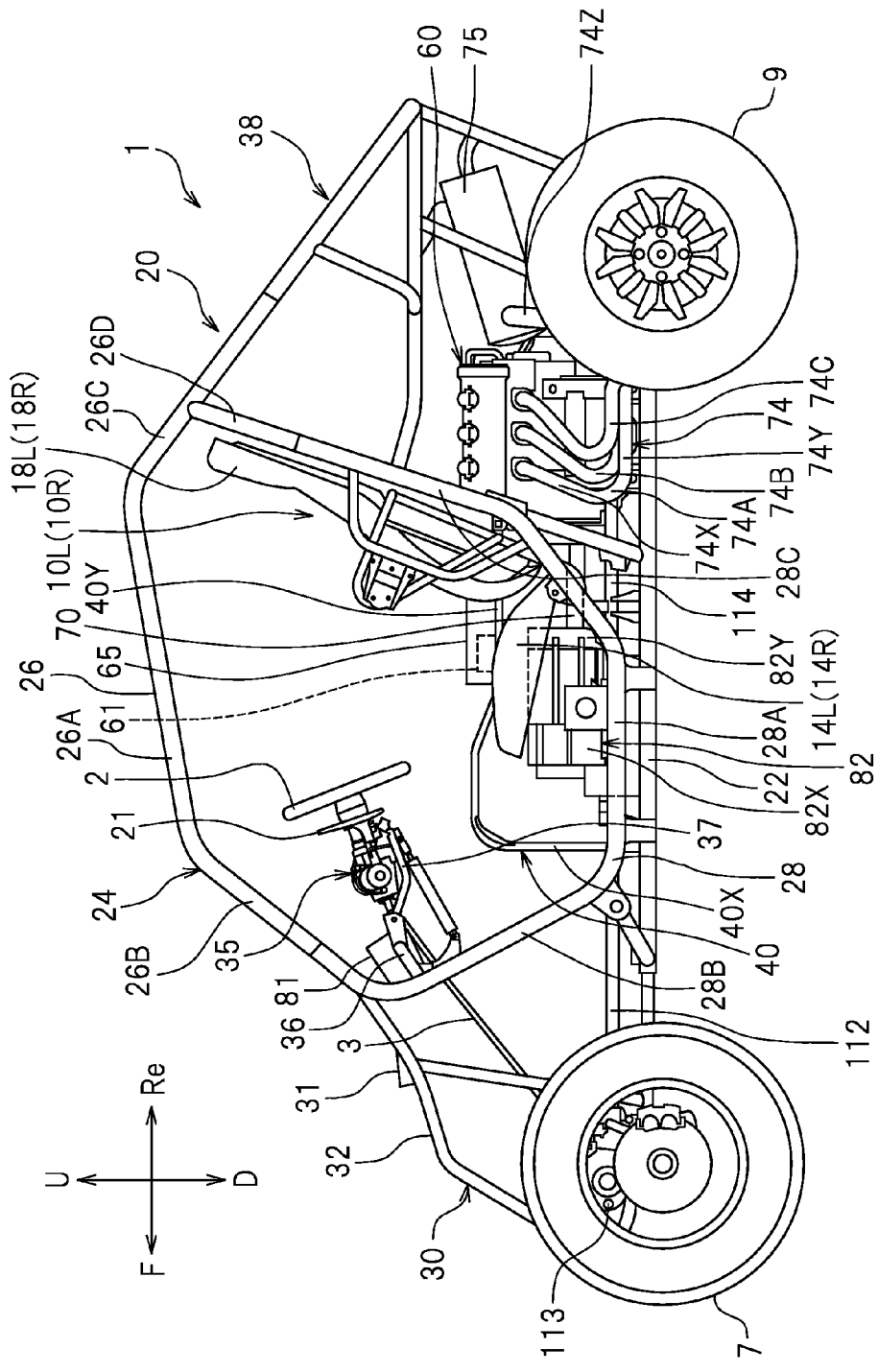
FIG. 1 is a left side view of an ROV according to a preferred embodiment of the present invention.

Hereinafter, vehicles according to preferred embodiments of the present invention will be described. As illustrated in FIG. 1, a vehicle according to the present preferred embodiment is preferably a recreational off-highway vehicle (ROV) 1, for example. The ROV 1 is suitable for traveling over rough terrain. The vehicles according to preferred embodiments of the present invention are not limited to an ROV.

Unless otherwise noted, the terms "front", "rear", "right", "left", "up", and "down" respectively refer to front, rear, right, left, up, and down with respect to a driver sitting on a seat 10L of the ROV 1 in the following description. The terms "up" and "down" respectively refer to the vertically upward direction and the vertically downward direction when the ROV 1 is stationary on a horizontal plane. Reference signs "F", "Re", "R", "L", "U", and "D" in the drawings respectively represent front, rear, right, left, up, and down.

As illustrated in FIG. 1, the ROV 1 preferably includes a body frame 20 that is preferably a pipe frame, for example. The body frame 20 preferably includes right and left main frames 22 each extending in the front-rear direction of the vehicle, a center frame 24 disposed higher than the main frames 22, a front frame 30 disposed in front of the center frame 24, and a rear frame 38 disposed behind the center frame 24.

The center frame 24 preferably includes right and left upper center subframes 26 and right and left lower center subframes 28. The right and left upper center subframes 26 are disposed above the right and left lower center subframes 28, respectively. The right and left upper center subframes 26 are connected to the right and left lower center subframes 28, respectively. The upper center subframes 26 preferably each include a first section 26A extending substantially in the front-rear direction of the vehicle, a second section 26B extending obliquely downward and forward from the front end of the first section 26A, a third section 26C extending obliquely downward and rearward from the rear end of the first section 26A, and a fourth section 26D extending obliquely downward and forward from a location somewhere along the third section 26C. The right and left lower center subframes 28 are disposed higher than the right and left main frames 22, respectively. The right and left lower center subframes 28 are joined to the right and left main frames 22, respectively. The right and left lower center subframes 28 preferably each include a first section 28A extending substantially in the front-rear direction of the vehicle, a second section 28B extending obliquely upward and forward from the front end of the first section 28A, and a third section 28C extending obliquely upward and rearward from the rear end of the first section 28A. The first sections 28A of the right and left lower center subframes 28 are joined to the right and left main frames 22, respectively. The second sections 28B of the right and left lower center subframes 28 are connected to the second sections 26B of the right and left upper center subframes 26, respectively. The third sections 28C of the right and left lower center subframes 28 are connected to the fourth sections 26D of the right and left upper center subframes 26, respectively.

Figure 2:
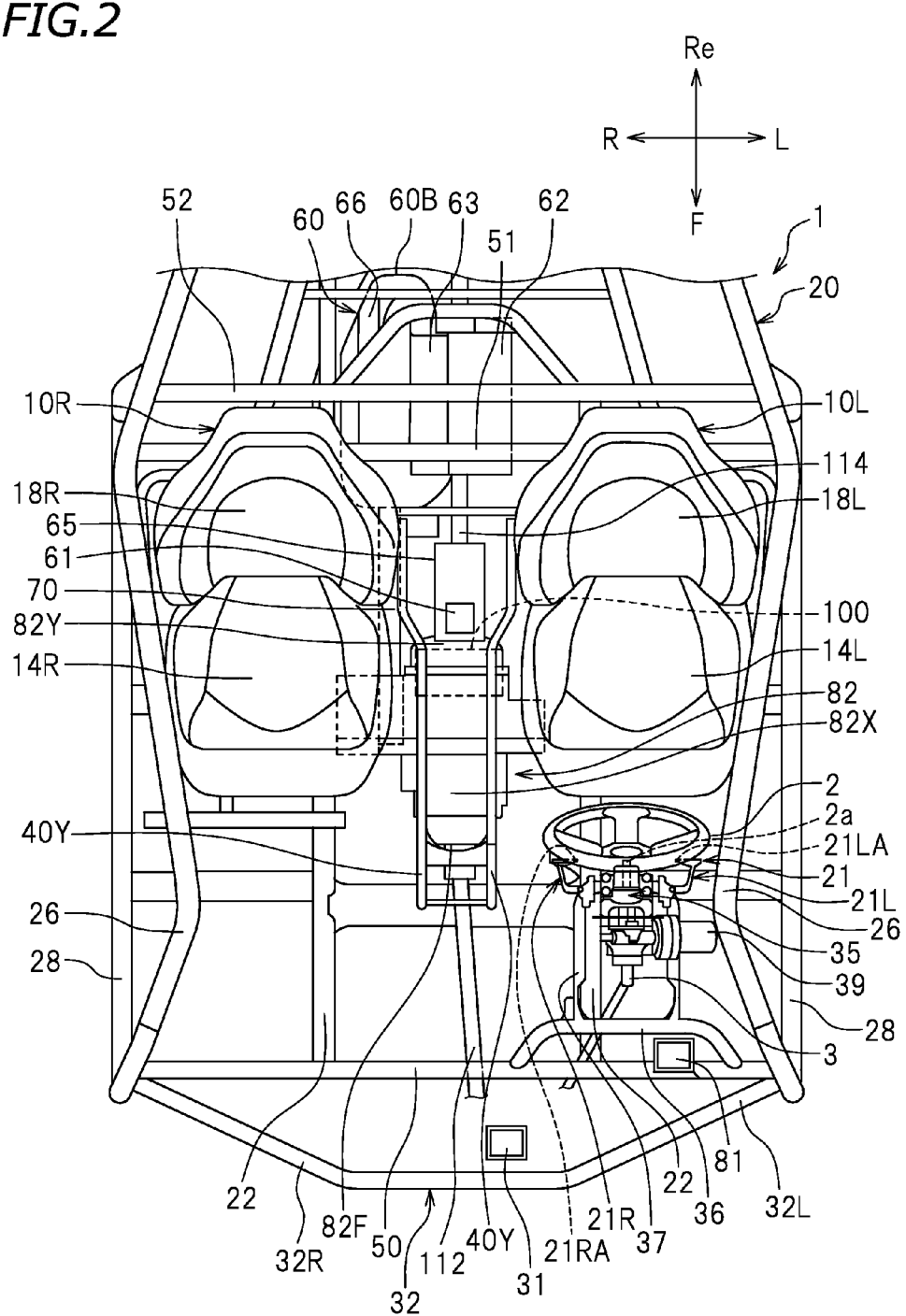
FIG. 2 is a partial plan view of the ROV.

As illustrated in FIG. 2, the body frame 20 preferably further includes cross members 50, 51, and 52. The cross members 50, 51, and 52 extend in the width direction of the vehicle. The cross member 51 is disposed rearward relative to the cross member 50. The cross member 52 is disposed rearward relative to the cross member 51. The cross members 50 and 51 are each connected to the right and left lower center subframes 28. The cross member 52 is connected to the right and left upper center subframes 26.

The front frame 30 preferably includes an upper front subframe 32 defining an upper portion of the front frame 30. The upper front subframe 32 is connected to the cross member 50. The upper front subframe 32 preferably includes a left portion 32L disposed leftward of a vehicle center line (not illustrated), and a right portion 32R disposed rightward of the vehicle center line. The right end of the left portion 32L and the left end of the right portion 32R are joined to each other, so that the left portion 32L and the right portion 32R are integral with each other. The left end of the left portion 32L and the right end of the right portion 32R are joined to the cross member 50.

The ROV 1 preferably further includes a steering wheel 2. The steering wheel 2 is disposed behind the cross member 50. The steering wheel 2 is joined to a steering pivot 2a. The steering pivot 2a is rotatably supported by a pivot support 35. The pivot support 35 is fixed to a U-shaped or substantially U-shaped supporting frame 37. The supporting frame 37 is fixed to a U-shaped or substantially U-shaped cross member 36. The cross member 36 is fixed to the cross member 50. The pivot support 35 is provided with a power steering system 39 that assists the driver in turning the steering wheel 2. The power steering system 39 is disposed leftward relative to the steering pivot 2a. The steering wheel 2 is rotatable around the steering pivot 2a and relative to the pivot support 35. A steering shaft 3 is attached to the front end portion of the steering pivot 2a. A paddle shifter 21 is provided in front of the steering wheel 2. The paddle shifter 21 allows the driver to shift gears (or change the gear position) manually. The paddle shifter 21 preferably includes a left paddle 21L, and a right paddle 21R separate from the left paddle 21L. The left paddle 21L is disposed leftward relative to the steering pivot 2a. The right paddle 21R is disposed rightward relative to the steering pivot 2a. The left paddle 21L of the paddle shifter 21 is provided with a downshifter 21LA. The right paddle 21R of the paddle shifter 21 is provided with an upshifter 21RA. The downshifter 21LA allows the driver to shift a transmission 80 to a lower gear (i.e., downshift the transmission 80). The upshifter 21RA allows the driver to shift the transmission 80 to a higher gear (i.e., upshift the transmission 80). The downshifter 21LA is marked with a symbol "−", for example, and the upshifter 21RA is marked with a symbol "+", for example. Thus, the driver is able to control the traveling direction of the ROV 1 with the steering wheel 2, and to shift gears with the paddle shifter 21.

Referring again to FIG. 1, the ROV 1 preferably further includes right and left front wheels 7, and right and left rear wheels 9. The right and left front wheels 7 are attached to an axle (not illustrated) provided on the front frame 30. The right and left rear wheels 9 are attached to an axle (not illustrated) provided on the rear frame 38. The right and left front wheels 7 are steered with the steering wheel 2, thus controlling the traveling direction of the ROV 1.

As illustrated in FIG. 2, the left seat 10L and a right seat 10R are disposed rearward relative to the steering wheel 2. The left seat 10L is supported by the left main frame 22. The right seat 10R is similarly supported by the right main frame 22. The right seat 10R is disposed rightward of the left seat 10L. The left seat 10L preferably includes a seat portion 14L on which the driver sits, and a backrest 18L. The right seat 10R preferably similarly includes a seat portion 14R on which a passenger sits, and a backrest 18R.

Figure 6:
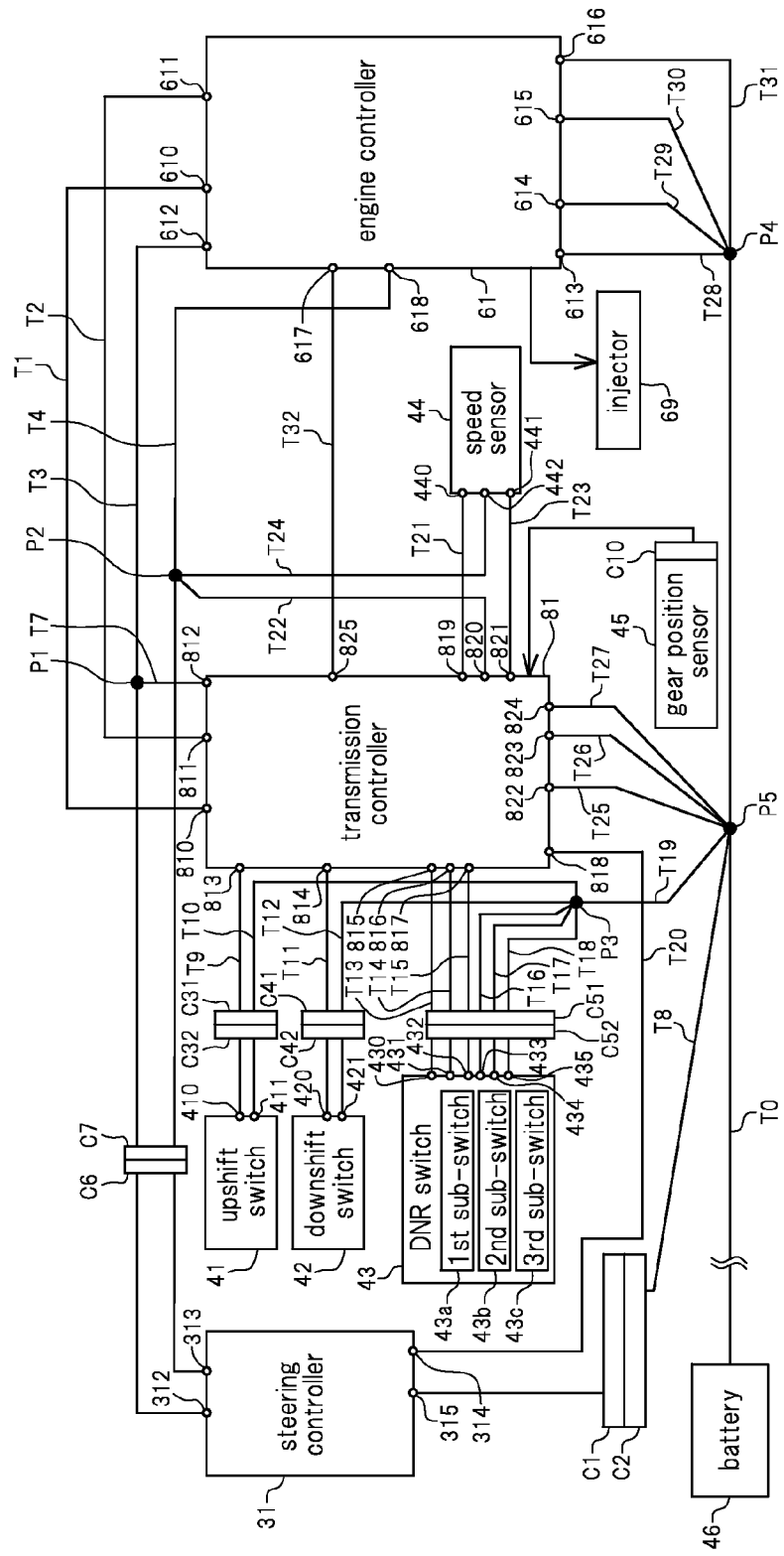
FIG. 6 is a block diagram illustrating electrical connections between the engine controller, the transmission controller, and the steering controller.
Figure 7:
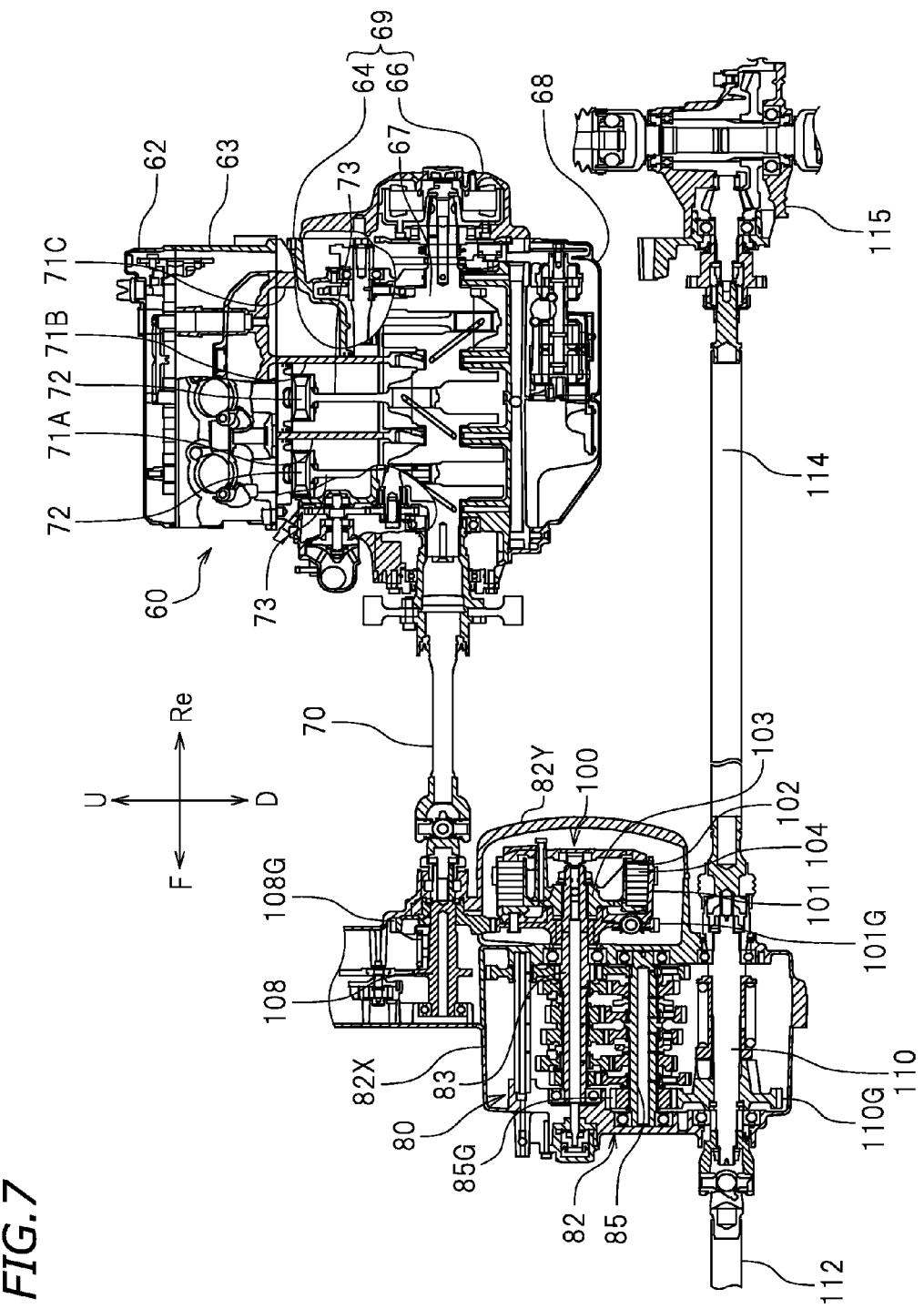
FIG. 7 is a cross-sectional view of an engine and a transmission of the ROV.

The ROV 1 preferably further includes an engine 60. An injector 69 (which is illustrated in FIG. 6 and will be described below) is disposed on the engine 60. The engine 60 is supported on a rear portion of the main frames 22 of the body frame 20. The engine 60 is disposed rearward relative to the seat portion 14L of the left seat 10L and the seat portion 14R of the right seat 10R. As illustrated in FIG. 1, the ROV 1 preferably further includes an exhaust system 74 through which exhaust gas discharged from the engine 60 flows, and a silencer 75. The exhaust system 74 is connected to the engine 60. The exhaust system 74 preferably includes first, second, and third exhaust pipes 74A, 74B, and 74C that are respectively in communication with first, second, and third cylinders 71A, 71B, and 71C (which are illustrated in FIG. 7 and will be described below). The first to third exhaust pipes 74A to 74C preferably each include a first section 74X extending obliquely downward and forward from a cylinder head 63 (which is illustrated in FIG. 7 and will be described below), and a second section 74Y extending rearward from the first section 74X. The rear end portions of the second sections 74Y of the first to third exhaust pipes 74A to 74C are combined into a third section 74Z. The rear end portion of the third section 74Z is connected with the silencer 75. In FIG. 2, the exhaust system 74 and the silencer 75 are not illustrated for the sake of convenience.

As illustrated in FIG. 1, the ROV 1 preferably includes the transmission 80 (see FIG. 7) to change a torque from the engine 60 and output the resulting torque, and a transmission case 82 housing the transmission 80. The transmission case 82 is attached to the main frames 22 of the body frame 20 similarly to the engine 60. As illustrated in FIG. 2, the transmission case 82 is disposed between the right and left seats 10R and 10L. In other words, the transmission 80 (see FIG. 7) is disposed between the right and left seats 10R and 10L. The transmission case 82 preferably includes a case body 82X and a case cover 82Y. The transmission case 82 is a component separate from the engine 60. This means that the transmission 80 is a component separate from the engine 60. The transmission case 82 is supported on a front portion of the body frame 20, and the engine 60 is supported on a rear portion of the body frame 20. In other words, the transmission 80 is disposed on the front portion of the body frame 20, and the engine 60 is disposed on the rear portion of the body frame 20. Thus, the transmission 80 is spaced apart from the engine 60.

As illustrated in FIG. 1, the ROV 1 preferably further includes right and left auxiliary frames 40 disposed substantially in the widthwise center of the ROV 1. The auxiliary frames 40 preferably each include a first section 40X disposed below the steering wheel 2, and extending upward from the associated main frame 22; and a second section 40Y extending rearward from the first section 40X. A battery box 65 is held via a holder (not illustrated) between the rear portions of the second sections 40Y of the right and left auxiliary frames 40. The battery box 65 is provided with neither a front surface nor an upper surface, and thus its front and top are open.

Figure 5:
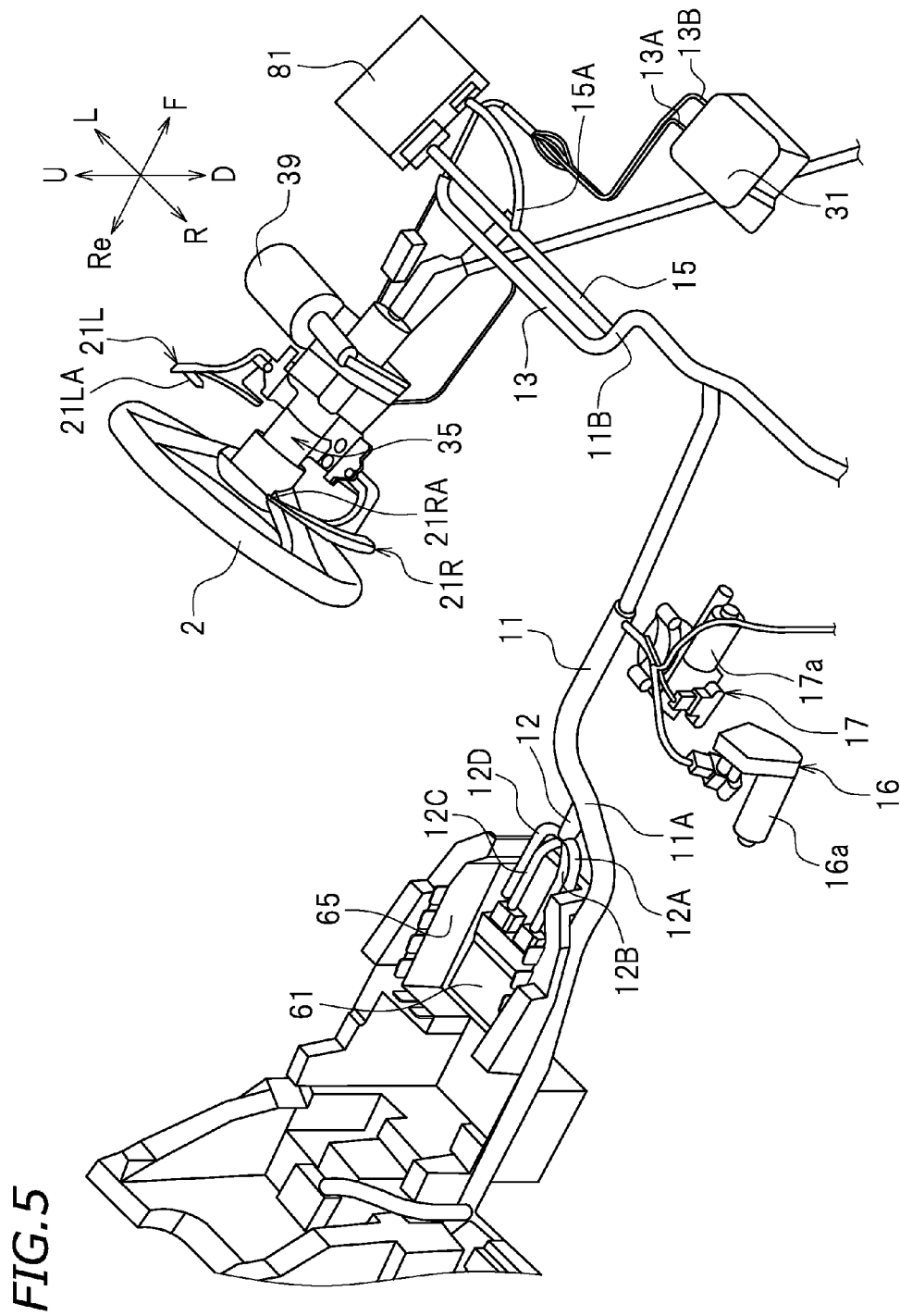
FIG. 5 is a perspective view of harnesses connecting an engine controller, a transmission controller, and a steering controller of the ROV.
Figure 8:
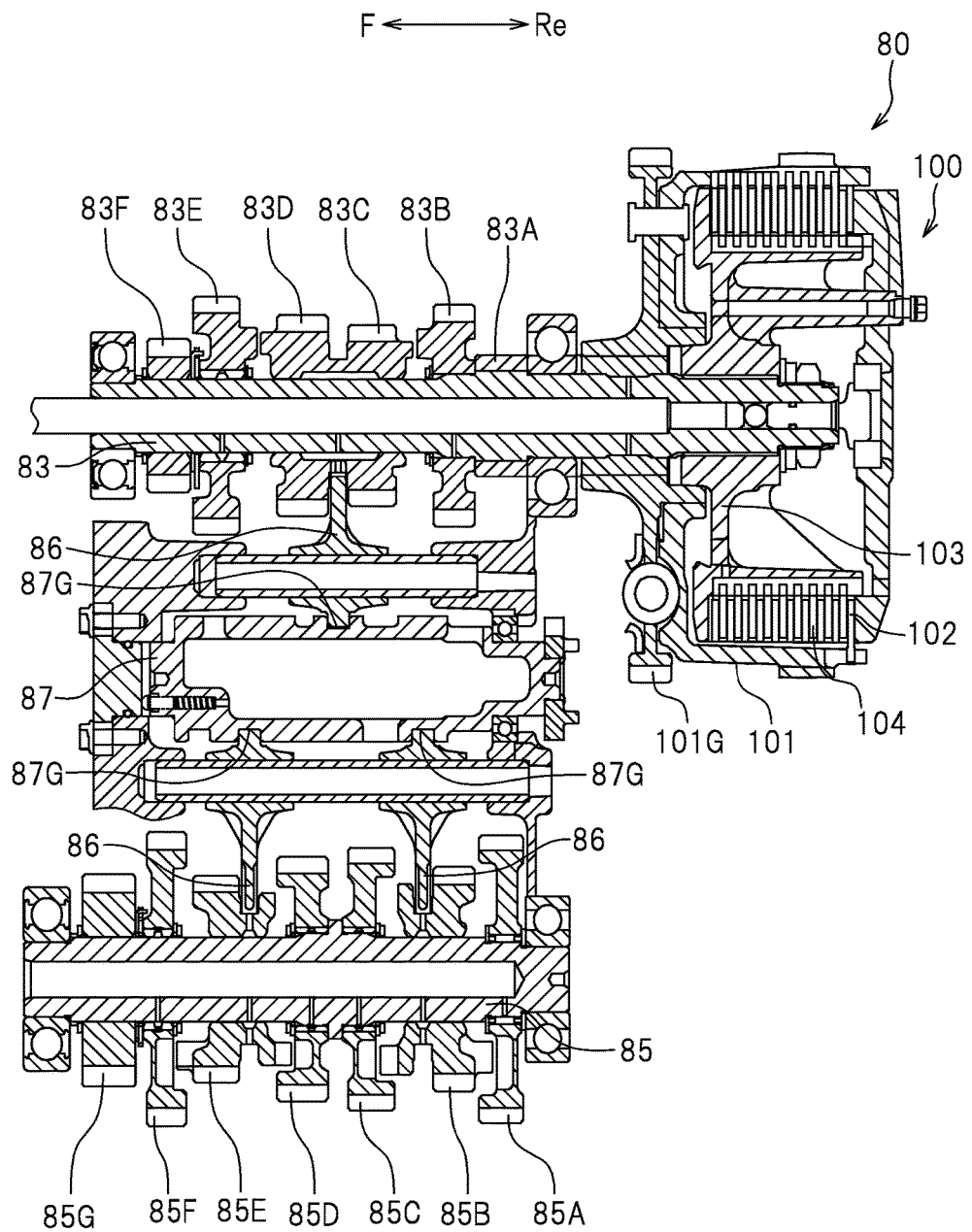
FIG. 8 is a cross-sectional view of the transmission.

The ROV 1 preferably further includes an engine controller 61, a transmission controller 81, and a steering controller 31. The engine controller 61 is configured or programmed to control electric current supplied to the injector 69. In other words, the engine controller 61 is configured or programmed to control the time during which the injector 69 is energized. The engine controller 61 is also configured or programmed to perform ignition control. The transmission controller 81 is configured or programmed to output signal(s) to control rotation of a motor 16a of a shift actuator 16 and rotation of a motor 17a of a clutch actuator 17 (which are illustrated in FIG. 5 and will be described below) in accordance with an engine speed and a vehicle speed, for example. The shift actuator 16 rotates a shift drum 87 (which is illustrated in FIG. 8 and will be described below). The clutch actuator 17 engages and disengages a clutch 100 (which is illustrated in FIG. 8 and will be described below). The steering controller 31 is configured or programmed to output a signal to control the power steering system 39. The exteriors of the engine controller 61, the transmission controller 81, and the steering controller 31 each preferably have a box shape, for example.

As illustrated in FIG. 1, the transmission controller 81 is disposed higher than the engine 60. The transmission controller 81 is disposed higher than the seat portions 14L and 14R. The transmission controller 81 is disposed higher than and forward relative to the transmission 80 housed in the transmission case 82.

Figure 3:
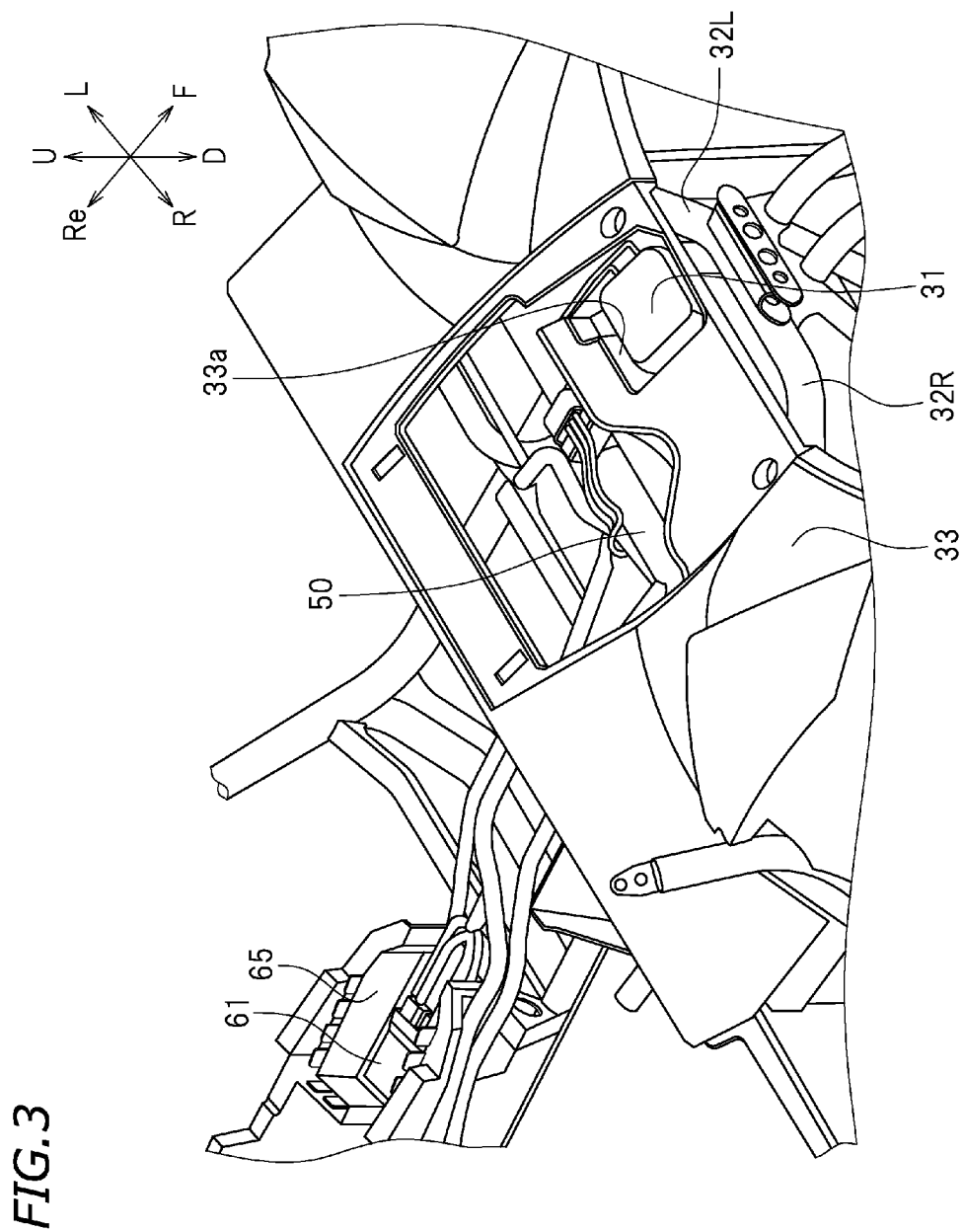
FIG. 3 is a perspective view of components of the ROV, such as a front fender.
Figure 4:
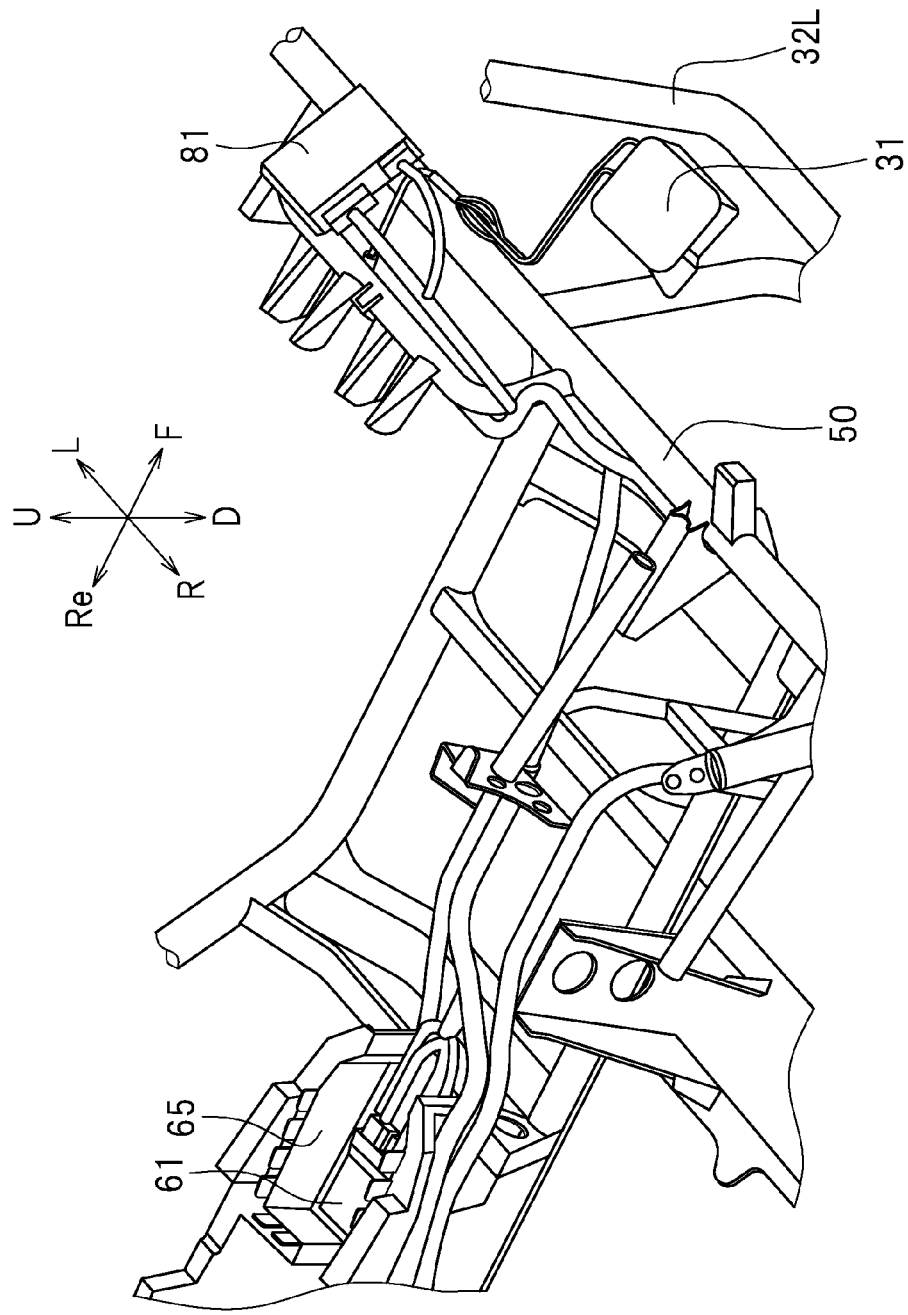
FIG. 4 is a diagram equivalent to FIG. 3 except that the front fender is removed therefrom.

As illustrated in FIGS. 1, 3 and 4, the engine controller 61 is fixed inside the battery box 65. As illustrated in FIG. 2, the engine controller 61 is disposed between a rear end 60B of the engine 60 and a front end 82F of the transmission case 82 in the front-rear direction of the vehicle. The transmission controller 81 is fixed to the left portion of the cross member 50 via a sheet metal member (not illustrated). The transmission controller 81 is disposed inside a front panel (not illustrated). The transmission controller 81 is disposed in front of the steering wheel 2.

As illustrated in FIG. 3, a front fender 33 extending in the width direction of the vehicle is fixed to the right and left portions 32R and 32L of the upper front subframe 32. The front fender 33 defines a portion of the exterior of the ROV 1. The front fender 33 is preferably made of resin, for example. The front fender 33 is provided with a recess 33a into which the steering controller 31 is fitted. The recess 33a of the front fender 33 is disposed leftward relative to the widthwise center of the vehicle. In other words, the recess 33a is disposed in a portion of the front fender 33 closer to the steering wheel 2. The steering controller 31 is fitted and fixed into the recess 33a of the front fender 33. Note that FIG. 4 is equivalent to FIG. 3 except that the front fender 33 is removed therefrom.

The engine controller 61 is disposed close to the engine 60. The transmission controller 81 is disposed close to the transmission 80. The steering controller 31 is disposed close to the steering wheel 2 or the paddle shifter 21.

Methods of fixing the controllers are not limited to those described above. The engine controller 61 may alternatively be fixed to, for example, the cross member 51 or 52 via a sheet metal member. The transmission controller 81 may alternatively be fixed to, for example, the central or right portion of the cross member 50. In another alternative example, an additional recess may be provided close to the recess 33a of the front fender 33 to which the steering controller 31 is fixed, and the transmission controller 81 may be fixed to the additional recess. The steering controller 31 may alternatively be fixed to the cross member 50 such that the steering controller 31 is adjacent to the transmission controller 81 fixed to the left portion of the cross member 50.

Next, harnesses connected to the controllers will be described. As illustrated in FIG. 5, a harness 11 including a plurality of wires bound together is disposed along the front-rear direction of the vehicle. The harness 11 is connected to a battery 46 (see FIG. 6). The harness 11 preferably includes a branch point 11A from which a harness 12 branches off, and a branch point 11B from which harnesses 13 and 15 branch off. The branch point 11B is disposed forward relative to the branch point 11A. Because the harness 12 branches off from the branch point 11A of the harness 11, the wires in the harness 11 are joined to wires in the harness 12 at the branch point 11A. The harness 12 binds together four sub-harnesses, i.e., sub-harnesses 12A, 12B, 12C, and 12D, which are connected to the engine controller 61. Because the harnesses 13 and 15 each branch off from the branch point 11B of the harness 11, the wires in the harness 11 are joined to wires in the harness 13 and wires in the harness 15 at the branch point 11B. Thus, the wires in the harness 13 and the wires in the harness 15 are also joined to each other at the branch point 11B. The harness 13 branches off into sub-harnesses 13A and 13B at some point along the harness 13. The sub-harnesses 13A and 13B are connected to the steering controller 31. The harness 15 is connected to the transmission controller 81. A sub-harness 15A branches off from the harness 15. The sub-harness 15A is connected to the transmission controller 81. With this arrangement, electric current is supplied to the engine controller 61, the transmission controller 81, and the steering controller 31.

Next, referring to FIG. 6, electrical connections between the engine controller 61, the transmission controller 81, and the steering controller 31 will be described. The engine controller 61 and the transmission controller 81 exchange information via data communication, such as controller area network (CAN) communication, for example. For example, two units are connected to each other through two wires so as to enable CAN communication therebetween. Thus, the two units are able to exchange a large amount of information using a small number of wires.

As illustrated in FIG. 6, the ROV 1 according to the present preferred embodiment preferably further includes, in addition to the engine controller 61, the transmission controller 81, and the steering controller 31, an upshift switch 41, a downshift switch 42, a DNR switch 43, a speed sensor 44, and a gear position sensor 45. The upshift switch 41 is turned on in response to an operation performed on the upshifter 21RA (see FIG. 2) by the driver. The downshift switch 42 is turned on in response to an operation performed on the downshifter 21LA (see FIG. 2) by the driver. The DNR switch 43 preferably includes three sub-switches, i.e., a first sub-switch 43a to cause the ROV 1 to move forward, a second sub-switch 43b to shift the gear of the ROV 1 to neutral, and a third sub-switch 43c to cause the ROV 1 to move backward. In response to a selective operation performed on a DNR operating element (not illustrated) by the driver, the corresponding sub-switch of the DNR switch 43 is selectively turned on. The speed sensor 44 detects the speed of the ROV 1. The gear position sensor 45 detects the gear position of the transmission 80 (which is illustrated in FIG. 7 and will be described below). More specifically, the gear position sensor 45 detects the gear position of the transmission 80 by detecting an angle of rotation of the shift drum 87 (which is illustrated in FIG. 8 and will be described below). The transmission controller 81 acquires gear position information from the gear position sensor 45. Alternatively, the gear position sensor 45 may be omitted. In that case, the transmission controller 81 may acquire voltage information of the upshift and downshift switches 41 and 42 so as to estimate the gear position from the voltage information.

The steering controller 31 preferably includes terminals 312 to 315. The terminal 315 is a grounding terminal electrically connected to connectors C1 and C2. The transmission controller 81 preferably includes terminals 810 to 825. The engine controller 61 preferably includes terminals 610 to 618. The transmission controller 81 and the engine controller 61 are each integral with connector(s). The gear position sensor 45 is electrically connected with a connector C10. The battery 46 is connected with a wire T0. The wire T0 preferably includes connecting points P4 and P5. The following wires, including the wire T0, are preferably made of the same material and have the same thickness.

The terminal 810 of the transmission controller 81 and the terminal 610 of the engine controller 61 are connected to each other through a wire T1. This enables low speed CAN communication between the transmission controller 81 and the engine controller 61. The terminal 811 of the transmission controller 81 and the terminal 611 of the engine controller 61 are connected to each other through a wire T2. This enables high speed CAN communication between the transmission controller 81 and the engine controller 61.

The terminal 825 of the transmission controller 81 and the terminal 617 of the engine controller 61 are connected to each other through a wire T32. This allows the transmission controller 81 and the engine controller 61 to exchange information. The terminal 312 of the steering controller 31 and the terminal 612 of the engine controller 61 are connected to each other through a wire T3 via connectors C6 and C7. The terminal 812 of the transmission controller 81 and a connecting point P1 on the wire T3 are connected to each other through a wire T7. This allows the engine controller 61, the transmission controller 81, and the steering controller 31 to exchange tachometer pulse information so as to acquire engine speed information. The terminal 313 of the steering controller 31 and the terminal 618 of the engine controller 61 are connected to each other through a wire T4 via the connectors C6 and C7. The terminal 820 of the transmission controller 81 and a connecting point P2 on the wire T4 are connected to each other through a wire T22. A terminal 442 of the speed sensor 44 and the connecting point P2 are connected to each other through a wire T24. Thus, the engine controller 61, the transmission controller 81, and the steering controller 31 exchange speed information.

The terminal 314 of the steering controller 31 and the terminal 818 of the transmission controller 81 are connected to each other through a wire T20. This allows the steering controller 31 and the transmission controller 81 to exchange various pieces of information. The terminal 819 of the transmission controller 81 and a terminal 440 of the speed sensor 44 are connected to each other through a wire T21. This allows the speed sensor 44 to be supplied with power. The terminal 821 of the transmission controller 81 and a terminal 441 of the speed sensor 44 are connected to each other through a wire T23, thus grounding the speed sensor 44. The terminal 315 of the steering controller 31 and the connecting point P5 on the wire T0 are connected to each other through a wire T8 via the connectors C1 and C2.

A terminal 410 of the upshift switch 41 and the terminal 813 of the transmission controller 81 are connected to each other through a wire T9 via connectors C31 and C32. This allows the transmission controller 81 to control switching of the upshift switch 41. The connecting point P5 on the wire T0 is connected with a wire T19. The wire T19 preferably includes a connecting point P3. A terminal 411 of the upshift switch 41 and the connecting point P3 are connected to each other through a wire T10 via the connectors C31 and C32. A terminal 420 of the downshift switch 42 and the terminal 814 of the transmission controller 81 are connected to each other through a wire T11 via connectors C41 and C42. This allows the transmission controller 81 to control switching of the downshift switch 42. A terminal 421 of the downshift switch 42 and the connecting point P3 are connected to each other through a wire T12 via the connectors C41 and C42.

A terminal 430 of the DNR switch 43 and the terminal 815 of the transmission controller 81 are connected to each other through a wire T13 via connectors C51 and C52. This allows the transmission controller 81 to control switching of the first sub-switch 43a of the DNR switch 43. A terminal 431 of the DNR switch 43 and the terminal 816 of the transmission controller 81 are connected to each other through a wire T14 via the connectors C51 and C52. This allows the transmission controller 81 to control switching of the second sub-switch 43b of the DNR switch 43. A terminal 432 of the DNR switch 43 and the terminal 817 of the transmission controller 81 are connected to each other through a wire T15 via the connectors C51 and C52. This allows the transmission controller 81 to control switching of the third sub-switch 43c of the DNR switch 43. The DNR switch 43 preferably further includes terminals 433, 434, and 435 that are respectively connected to the first, second, and third sub-switches 43a, 43b, and 43c. The terminals 433, 434, and 435 are respectively connected through wires T16, T17, and T18 to the connecting point P3. Thus, the wires T16, T17, and T18 are each connected through the wire T19 to the connecting point P5.

Terminals 822, 823, and 824 of the transmission controller 81 are respectively connected with wires T25, T26, and T27. The wires T25, T26, and T27 are each connected to the connecting point P5. Terminals 613, 614, 615, and 616 of the engine controller 61 are respectively connected with wires T28, T29, T30, and T31. The wires T28, T29, T30, and T31 are each connected to the connecting point P4.

As described above, the wire T8 connected to the steering controller 31, the wires T25 to T27 connected to the transmission controller 81, and the wires T28 to T31 connected to the engine controller 61 are connected to each other at the connecting point P5 on the wire T0 connected to the battery 46. This equalizes potentials of the steering controller 31, the transmission controller 81, and the engine controller 61. The wire T10 connected to the upshift switch 41, the wire T12 connected to the downshift switch 42, and the wires T16 to T18 connected to the DNR switch 43 are each connected to the connecting point P5 through the wire T19. This makes potentials of the upshift switch 41, the downshift switch 42, and the DNR switch 43 equal to the potentials of the controllers.

The wire T8 including the connectors C1 and C2 and connecting the terminal 315 and the connecting point P5 is an example of a "first wire". As used herein, the term "wire length between the steering controller 31 and the connecting point P5" refers to the length of the wire T8 connecting the terminal 315 of the steering controller 31 and the connecting point P5. The longest one of the wires T28 to T31 and the wire connecting the connecting points P4 and P5 are an example of a "second wire". The term "wire length between the engine controller 61 and the connecting point P5" refers to the sum of the length of the longest one of the wires T28 to T31 respectively connecting the terminals 613 to 616 of the engine controller 61 and the connecting point P4, and the length of the wire T0 measured between the connecting points P4 and P5. The longest one of the wires T25 to T27 is an example of a "third wire". The term "wire length between the transmission controller 81 and the connecting point P5" refers to the length of the longest one of the wires T25 to T27 respectively connecting the terminals 822, 823, and 824 of the transmission controller 81 and the connecting point P5.

In the present preferred embodiment, the transmission controller 81 that controls the shift actuator 16 and the clutch actuator 17 is supplied with a relatively large current of, for example, about 60 A from the battery 46 (see FIG. 6). The steering controller 31 is supplied with a current of, for example, about 30 A, from the battery 46. The engine controller 61 is supplied with a current of, for example, about 10 A from the battery 46. Thus, the controllers are ranked, in ascending order of current supplied thereto, as follows: the engine controller 61, the steering controller 31, and the transmission controller 81. According to Ohm's law (V=RI, where V is voltage, R is resistance, and I is current), the larger the current I, the higher the voltage V if the resistance R is constant. The transmission controller 81, the steering controller 31, and the engine controller 61 are connected to the battery 46 through the wires, and thus resistance varies depending on the lengths of the wires. Resistance tends to increase as the wire increases in length. This can cause erroneous detection of a voltage signal at some electrical connections of the wires for the controllers due to wire length-induced resistance. For example, suppose that a normal low-level output voltage is 0.5 V, a normal high-level output voltage is 4.5 V, and a threshold value for determining whether the output voltage is low level or high level is 3.0 V. In this case, when the wire length-induced resistance is large, the detected low-level output voltage may be 3.5 V, for example. To prevent such an unfavorable event, it is desirable to reduce the resistances of the wires connecting the battery 46 and the controllers. Because V=RI as already stated, the larger the current I, the greater the effect of reducing the resistance R will be. In view of this, the wire length for each controller according to a preferred embodiment of the present invention is decided on the basis of the magnitude of current flowing through the controller. Specifically, the wire length is reduced with increasing current in the present preferred embodiment. Accordingly, the wire lengths between the controllers and the connecting point P5 are ranked, in ascending order, as follows: the wire length between the transmission controller 81 and the connecting point P5, the wire length between the steering controller 31 and the connecting point P5, and the wire length between the engine controller 61 and the connecting point P5. The wire length between the transmission controller 81 and the connecting point P5 is shorter than the wire length between the steering controller 31 and the connecting point P5. The wire length between the steering controller 31 and the connecting point P5 is shorter than the wire length between the engine controller 61 and the connecting point P5. Thus, the effect of reducing the wire length-induced resistance is achieved for the transmission controller 81 and the steering controller 31 through which relatively large currents flow. Because a relatively small current flows through the engine controller 61, the wire length-induced resistance for the engine controller 61 is not much influenced. Consequently, an unfavorable event, such as an increase in the detected low-level output voltage, is prevented for each controller. Note that each wire length is not limited to any particular length. For example, assuming that the wire length between the engine controller 61 and the connecting point P5 is 1, then the wire length between the transmission controller 81 and the connecting point P5 ranges from 0.2 to 0.8, and the wire length between the steering controller 31 and the connecting point P5 ranges from 0.1 to 0.4.

Next, a power transmission mechanism including the engine 60 and the transmission 80 of the ROV 1 according to the present preferred embodiment will be described in detail. As illustrated in FIG. 7, the engine 60 preferably includes a crankcase 66, a cylinder body 64, the cylinder head 63, and a cylinder head cover 62. Disposed below the crankcase 66 is an oil pan 68 to collect oil that has flowed through the engine 60. The cylinder body 64 extends upward from the crankcase 66. The cylinder head 63 is disposed on the cylinder body 64 and joined to the upper portion of the cylinder body 64. The cylinder head cover 62 is disposed on the cylinder head 63 and joined to the upper portion of the cylinder head 63.

The engine 60 preferably further includes a crankshaft 67 extending in the front-rear direction of the vehicle. The crankshaft 67 is disposed inside the crankcase 66. The front end portion of the crankshaft 67 is connected with a connecting shaft 70. The connecting shaft 70 is connected to an input shaft 108 (which will be described below).

The first, second, and third cylinders 71A, 71B, and 71C are provided inside the cylinder body 64. The first, second, and third cylinders 71A, 71B, and 71C extend upward from a lateral portion of the crankcase 66. The first, second, and third cylinders 71A, 71B, and 71C are preferably aligned in the front-rear direction of the vehicle. The second cylinder 71B is disposed behind the first cylinder 71A. The third cylinder 71C is disposed behind the second cylinder 71B. The engine 60 is preferably a three cylinder engine, for example. The first, second, and third cylinders 71A, 71B, and 71C each contain a piston 72. Each piston 72 is connected to the crankshaft 67 via an associated connecting rod 73. Although the engine 60 according to the present preferred embodiment is preferably a three cylinder engine, for example, equipped with the first, second, and third cylinders 71A, 71B, and 71C, the engine 60 may be a single cylinder engine, or may be a multi-cylinder engine equipped with two cylinders or four or more cylinders.

The transmission 80 preferably includes the input shaft 108, the clutch 100, a main shaft 83, a drive shaft 85, and an output shaft 110. The input shaft 108 extends in the front-rear direction of the vehicle. The input shaft 108 is housed in the transmission case 82. The input shaft 108 is preferably disposed coaxially with the crankshaft 67. The shaft center (not illustrated) of the input shaft 108 may be out of alignment with the shaft center (not illustrated) of the crankshaft 67. The input shaft 108 is connected to the connecting shaft 70. The input shaft 108 rotates by receiving a driving force from the crankshaft 67. The input shaft 108 is provided with a gear 108G. Although the input shaft 108 is connected to the crankshaft 67 via the connecting shaft 70 in the present preferred embodiment, the input shaft 108 may alternatively be directly connected to the crankshaft 67.

The clutch 100 is preferably a wet, multi-plate friction clutch, for example. Torque generated by the crankshaft 67 is transmitted to the clutch 100 through the input shaft 108. The clutch 100 transmits or cuts off the torque generated by the crankshaft 67. The clutch 100 is disposed inside the transmission case 82. The clutch 100 is exposed by detaching the case cover 82Y of the transmission case 82 from the case body 82X. The clutch 100 is provided on the rear end portion of the main shaft 83. As illustrated in FIG. 8, the clutch 100 is located rearward relative to main shaft gears 83A to 83F provided on the main shaft 83. The clutch 100 is located rearward relative to drive shaft gears 85A to 85F provided on the drive shaft 85. As illustrated in FIG. 2, the clutch 100 is disposed between the right and left seats 10R and 10L. As illustrated in FIG. 8, the clutch 100 preferably includes a clutch housing 101, a clutch boss 103, a plurality of driving plates 102, and a plurality of driven plates 104. The driving plates 102 are provided inward of the clutch housing 101. The driving plates 102 rotate together with the clutch housing 101. The torque of the crankshaft 67 (see FIG. 7) is transmitted to the driving plates 102. The driven plates 104 are provided outward of the clutch boss 103. The driven plates 104 rotate together with the clutch boss 103. The driving plates 102 and the driven plates 104 are arranged alternately in the front-rear direction of the vehicle. The clutch housing 101 is provided with a gear 101G. As illustrated in FIG. 7, the gear 101G intermeshes with the gear 108G of the input shaft 108. Thus, the clutch housing 101 is connected to the input shaft 108. Alternatively, the clutch 100 may be a single-plate friction clutch or a dry friction clutch.

The main shaft 83 extends in the front-rear direction of the vehicle. The main shaft 83 is housed in the transmission case 82. The main shaft 83 is parallel or substantially parallel to the input shaft 108. The main shaft 83 is fixed to the clutch boss 103. The main shaft 83 rotates together with the clutch boss 103. The main shaft 83 rotates by receiving a driving force from the crankshaft 67. As illustrated in FIG. 8, the main shaft 83 is provided with the main shaft gears 83A to 83F. The main shaft gears 83A, 83B, 83E, and 83F are fixed gears that are immovable along the axis of the main shaft 83. The main shaft gears 83C and 83D are movable gears that are movable along the axis of the main shaft 83. The main shaft gears 83A to 83F rotate together with the main shaft 83. The main shaft gears 83B and 83E may rotate with respect to the main shaft 83 depending on intermeshing states thereof.

The drive shaft 85 is provided inside the transmission case 82, and extends in the front-rear direction of the vehicle. The drive shaft 85 is parallel or substantially parallel to the main shaft 83. As illustrated in FIG. 8, the drive shaft 85 is provided with the drive shaft gears 85A to 85F. The drive shaft gears 85A to 85F respectively intermesh with the main shaft gears 83A to 83F. The drive shaft gears 85A, 85C, 85D, and 85F are fixed gears that are immovable along the axis of the drive shaft 85. The drive shaft gears 85B and 85E are movable gears that are movable along the axis of the drive shaft 85. The drive shaft gears 85A to 85F rotate together with the drive shaft 85. The drive shaft gears 85A, 85C, 85D, and 85F may rotate with respect to the drive shaft 85 depending on intermeshing states thereof. The front end portion of the drive shaft 85 is provided with a gear 85G. The gear 85G is disposed forward relative to the drive shaft gear 85F.

The output shaft 110 is provided inside the transmission case 82, and extends in the front-rear direction of the vehicle. The output shaft 110 is provided with a gear 110G. The gear 110G intermeshes with the gear 85G of the drive shaft 85. Thus, the output shaft 110 is connected to the drive shaft 85. The output shaft 110 rotates by receiving a driving force from the drive shaft 85. The front end portion of the output shaft 110 is connected with a front propeller shaft 112. The front propeller shaft 112 extends in the front-rear direction of the vehicle. The front propeller shaft 112 rotates by receiving a driving force from the output shaft 110. The front propeller shaft 112 is connected to the right and left front wheels 7 (see FIG. 1) via a front differential 113 (see FIG. 1). The rear end portion of the output shaft 110 is connected with a rear propeller shaft 114. The rear propeller shaft 114 extends in the front-rear direction of the vehicle. The rear propeller shaft 114 rotates by receiving a driving force from the output shaft 110. The rear propeller shaft 114 is connected to the right and left rear wheels 9 (see FIG. 1) via a final gear 115. The ROV 1 according to the present preferred embodiment is preferably a four-wheel drive vehicle as just described, but is not limited to such a vehicle.

As illustrated in FIG. 8, the transmission 80 preferably includes the shift drum 87 and a shift fork 86. The shift drum 87 is provided with a plurality of grooves 87G. The axial position of each groove 87G changes in accordance with an angle of rotation of the shift drum 87. Each groove 87G is in engagement with the shift fork 86. The shift fork 86 is in engagement with the main shaft gears 83C and 83D and the drive shaft gears 85B and 85E. Rotation of the shift drum 87 moves the shift fork 86 along the axis of the shift drum 87. The shift fork 86 in turn moves at least one of the main shaft gears 83C and 83D and the drive shaft gears 85B and 85E. This changes the combination of the intermeshing gears selected from the main shaft gears 83A to 83F and the drive shaft gears 85A to 85F, thus changing the transmission gear ratio.

Figure 9:
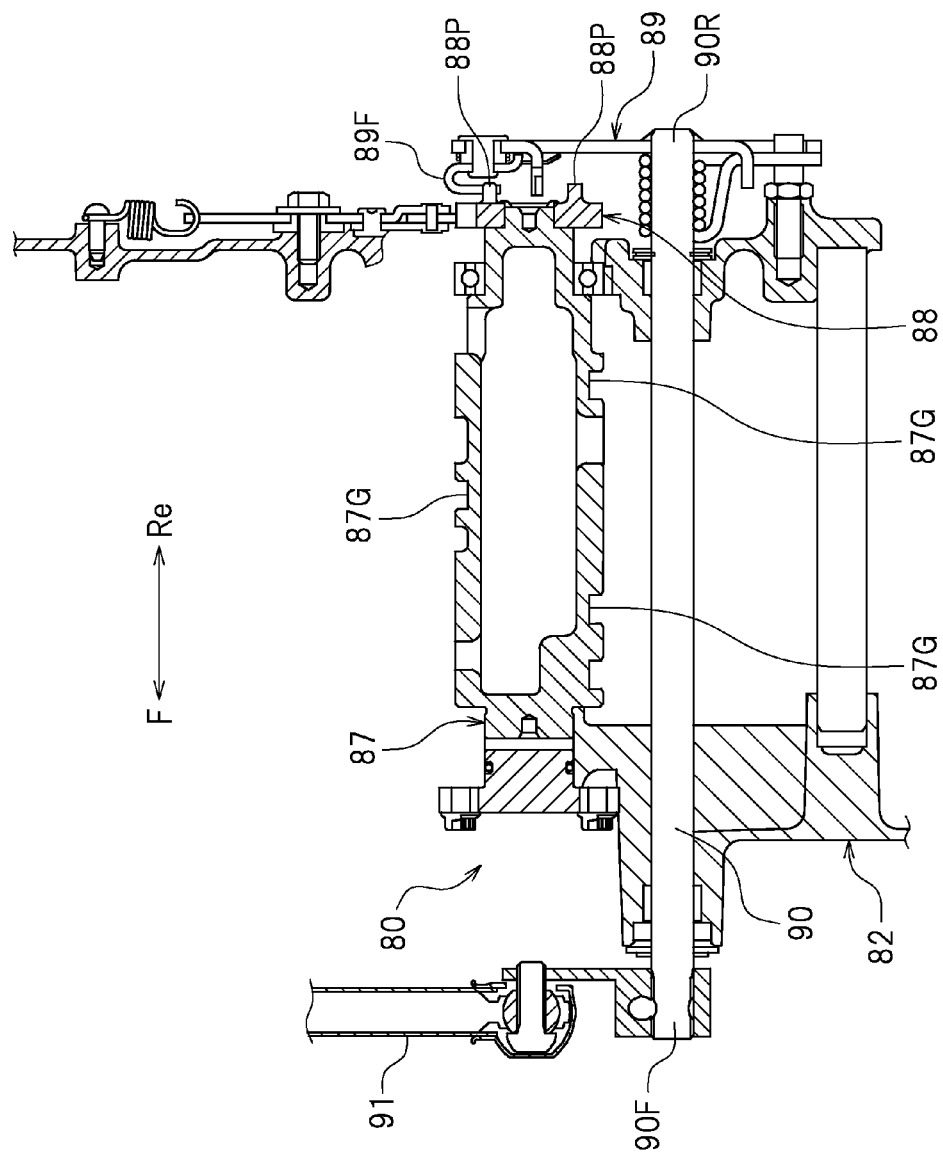
FIG. 9 is a cross-sectional view of a shift drum of the transmission.

As illustrated in FIG. 9, the transmission 80 preferably further includes a rotatable shift shaft 90. The shift shaft 90 extends in the front-rear direction of the vehicle. The shift shaft 90 is supported by the transmission case 82. The shift shaft 90 preferably includes a rear end portion 90R to which a shift lever 89 is fixed. The shift shaft 90 preferably further includes a front end portion 90F located outward of the transmission case 82. The front end portion 90F is connected to a shift rod 91 that is connected to the shift actuator 16 (see FIG. 5).

The transmission 80 preferably includes a rotational plate 88 and the shift lever 89. The rotational plate 88 preferably includes a plurality of pins 88P. The rotational plate 88 is fixed to the rear end of the shift drum 87. The rotational plate 88 rotates together with the shift drum 87. The shift lever 89 is brought into engagement with the rotational plate 88. The shift lever 89 is provided with a hook 89F engageable with the pin(s) 88P of the rotational plate 88.

An operation performed on the paddle shifter 21 by the driver causes the transmission controller 81 to drive the motor 16a of the shift actuator 16. This rotates the shift shaft 90 so as to rotate the shift lever 89. With this rotation, the hook 89F of the shift lever 89 is brought into engagement with the pin(s) 88P of the rotational plate 88, causing the shift drum 87 to rotate together with the rotational plate 88. As a result, the transmission gear ratio changes.

As described above, the engine controller 61 is configured or programmed to output a signal to control the injector 69 of the engine 60, and the transmission controller 81 is configured or programmed to output a signal to control the gear position of the transmission 80 are spaced apart from each other in the ROV 1 according to the present preferred embodiment. This allows each of the engine controller 61 and the transmission controller 81 to be smaller in size than an ECU that combines engine control and transmission control functions. Thus, the engine controller 61 and the transmission controller 81 each have increased layout flexibility, while the resulting vehicle does not increase in size. For example, suppose that vehicles of the same type are designed to be not only an AMT vehicle but also a non-AMT vehicle. In that case, an ECU that combines engine control and transmission control functions must be installed also on a non-AMT vehicle according to conventional techniques. In the present preferred embodiment, however, the engine controller 61 and the transmission controller 81 are spaced apart from each other. Because the engine controller 61 and the transmission controller 81 are separate from each other, it is unnecessary to install the transmission controller 81 on a non-AMT vehicle. This consequently increases layout flexibility and reduces cost.

The engine controller 61 of the ROV 1 according to the present preferred embodiment is electrically connected to the connecting point P5, which is disposed at a location somewhere along the wire T0 to connect the transmission controller 81 and the battery 46 to each other. More specifically, the wires T28 to T31 from the engine controller 61 and the wires T25 to T27 from the transmission controller 81 are electrically connected to each other at the connecting point P5. This equalizes the potentials of the engine controller 61 and the transmission controller 81. Thus, fluctuations in the potentials of the engine controller 61 and the transmission controller 81 with respect to a ground potential do not occur. Consequently, erroneous detection of sensor values is prevented for the engine controller 61 and the transmission controller 81.

The steering controller 31 of the ROV 1 according to the present preferred embodiment is electrically connected to the connecting point P5. More specifically, the wires T28 to T31 from the engine controller 61, the wires T25 to T27 from the transmission controller 81, and the wire T8 from the steering controller 31 are electrically connected to each other at the connecting point P5. This equalizes the potentials of the engine controller 61, the transmission controller 81, and the steering controller 31. Thus, fluctuations in the potentials of the engine controller 61, the transmission controller 81, and the steering controller 31 with respect to the ground potential do not occur. Consequently, erroneous detection of sensor values is prevented for the engine controller 61, the transmission controller 81, and the steering controller 31.

In the ROV 1 according to the present preferred embodiment, the current supplied to the transmission controller 81 and the current supplied to the steering controller 31 are each larger than the current supplied to the engine controller 61. The wire length between the transmission controller 81 and the connecting point P5 is shorter than the wire length between the engine controller 61 and the connecting point P5. The wire length between the steering controller 31 and the connecting point P5 is shorter than the wire length between the engine controller 61 and the connecting point P5. Thus, the wire length between the transmission controller 81, to which a relatively large current is supplied, and the connecting point P5 is relatively short, and the wire length between the steering controller 31, to which a relatively large current is supplied, and the connecting point P5 is also relatively short, so that wire length-induced resistance is small. Consequently, an unfavorable event in which the low-level output voltage of each controller exceeds the threshold value, for example, is unlikely to occur.

The transmission 80 of the ROV 1 according to the present preferred embodiment is disposed in front of the engine 60. In other words, the engine 60 is disposed behind the transmission 80. Thus, layout flexibility in the width direction of the vehicle is higher than when the transmission 80 and the engine 60 are disposed along the width direction of the vehicle.

The engine 60 and the transmission 80 of the ROV 1 according to the present preferred embodiment are separate from each other. Thus, the engine 60 and the transmission case 82, housing the transmission 80, have higher layout flexibility than when the engine 60 and the transmission case 82 are integral with each other. This means that the engine 60 and the transmission case 82 are disposed more compactly than when the engine 60 and the transmission case 82 are integral with each other. Consequently, the vehicle does not increase in size.

The transmission controller 81 of the ROV 1 according to the present preferred embodiment is disposed higher than the engine 60. This makes the transmission controller 81 less likely to submerge than when the transmission controller 81 is disposed lower than the engine 60.

The transmission controller 81 of the ROV 1 according to the present preferred embodiment is disposed higher than the seat portions 14L and 14R. This makes the transmission controller 81 less likely to submerge than when the transmission controller 81 is disposed lower than the seat portions 14L and 14R.

The transmission controller 81 of the ROV 1 according to the present preferred embodiment is disposed higher than the transmission 80 housed in the transmission case 82. This makes the transmission controller 81 less likely to submerge than when the transmission controller 81 is disposed lower than the transmission 80.

Preferred embodiments have been described on the assumption that the ROV 1 includes the steering controller 31 configured or programmed to output a signal to control power steering, and that the steering controller 31, the engine controller 61, and the transmission controller 81 are connected to each other at the shared connecting point P5. The present invention is, however, not limited to such an arrangement. For example, the ROV 1 may include no steering controller 31. In that case, the engine controller 61 and the transmission controller 81 are connected to each other at the connecting point P5.

The transmission 80 according to the present preferred embodiment is preferably an AMT, so that the driver operates the paddle shifter 21 to drive the motor 16a of the shift actuator 16 and thus the motor 16a enables shifting of the gears of the transmission 80. The transmission 80 is, however, not limited to an AMT. The transmission 80 may alternatively be an automatic transmission, so that the gears of the transmission are automatically shifted by a motor in accordance with a traveling state of the vehicle and irrespective of intention of the driver.

In the present preferred embodiment, the wire length between the transmission controller 81 and the connecting point P5 and the wire length between the steering controller 31 and the connecting point P5 are preferably each shorter than the wire length between the engine controller 61 and the connecting point P5. Note that the wire length between the transmission controller 81 and the connecting point P5 may be equal to, shorter than, or longer than the wire length between the steering controller 31 and the connecting point P5. In view of the fact that the current supplied to the transmission controller 81 is larger than the current supplied to the steering controller 31, the wire length between the transmission controller 81 and the connecting point P5 is preferably shorter than the wire length between the steering controller 31 and the connecting point P5.

Although a preferred embodiment has been described on the assumption that the transmission 80 is disposed in front of the engine 60, or the engine 60 is disposed behind the transmission 80, the transmission 80 and the engine 60 are not limited to these locations. Alternatively, the transmission 80 may be disposed behind the engine 60, or the engine 60 may be disposed in front of the transmission 80. In that case, the transmission controller 81 is disposed rearward relative to the engine controller 61, or the engine controller 61 is disposed forward relative to the transmission controller 81.

Although the wires connected to the steering controller 31, the engine controller 61, and the transmission controller 81 are preferably made of the same material and have the same thickness in the present preferred embodiment, these wires are not limited to these conditions. For example, these wires may be made of different materials or may have different thicknesses, such that electrical resistances of the wires are ranked, in descending order, as follows: the electrical resistance of the wire between the engine controller 61 and the connecting point P5, the electrical resistance of the wire between the steering controller 31 and the connecting point P5, and the electrical resistance of the wire between the transmission controller 81 and the connecting point P5.

The terms and expressions that have been employed are used as terms of description and not of limitation, and there is no intention, in the use of such terms and expressions, of excluding any equivalents of the features shown and described or portions thereof, but it is recognized that various modifications are possible within the scope of the present invention claimed. While the present invention may be embodied in many different forms, a number of preferred embodiments are described herein with the understanding that the present disclosure is to be considered as providing examples of the principles of the present invention and that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame supporting three or more wheels;
   an engine attached to the body frame;
   a transmission that is attached to the body frame and changes torque from the engine and outputs a resulting torque;
   a gear position sensor that detects a gear position of the transmission;
   an injector that is disposed on the engine and supplies fuel to the engine;
   an engine controller configured or programmed to control the injector; and
   a transmission controller configured or programmed to acquire gear position information from the gear position sensor and to control the gear position of the transmission; wherein
   the engine controller and the transmission controller are spaced apart from each other; and
   a distance between the transmission controller and the transmission is shorter than a distance between the transmission controller and the engine.

2. The vehicle according to claim 1, wherein the transmission controller is disposed higher than the engine.

3. The vehicle according to claim 1, further comprising a seat on which a driver sits, wherein the seat is supported by the body frame, and the transmission controller is disposed higher than the seat.

4. The vehicle according to claim 1, wherein the transmission controller is disposed higher than the transmission.

5. The vehicle according to claim 1, further comprising:
   a battery that supplies current to each of the engine controller and the transmission controller; and
   a wire harness including a first end connected to the battery, and a second end connected to the transmission controller; wherein
   the engine controller is electrically connected to a connecting point between the first end and the second end of the wire harness.

6. The vehicle according to claim 1, further comprising a speed sensor that detects a speed of the vehicle, wherein the transmission controller is configured or programmed to acquire at least speed information from the speed sensor.

7. The vehicle according to claim 1, wherein the transmission is disposed in front of the engine.

8. The vehicle according to claim 1, wherein the engine and the transmission are separate from each other.

9. A vehicle comprising:
   a body frame supporting three or more wheels;
   an engine attached to the body frame;
   a transmission that is attached to the body frame and changes torque from the engine and outputs a resulting torque;
   an injector that is disposed on the engine and supplies fuel to the engine;
   an engine controller configured or programmed to control the injector;
   a transmission controller configured or programmed to control a gear position of the transmission;
   a battery that supplies current to each of the engine controller and the transmission controller;
   a wire harness including a first end connected to the battery, and a second end connected to the transmission controller;
   a power steering system; and
   a steering controller configured or programmed to control the power steering system; wherein
   the engine controller and the transmission controller are spaced apart from each other;

the engine controller is electrically connected to a connecting point between the first end and the second end of the wire harness;
the battery supplies current to the steering controller; and
the steering controller is electrically connected to the connecting point.

10. The vehicle according to claim 9, wherein
the wire harness includes:
   a first wire connecting the steering controller and the connecting point;
   a second wire connecting the engine controller and the connecting point; and
   a third wire connecting the transmission controller and the connecting point;
the current supplied to the transmission controller and the current supplied to the steering controller are each greater than the current supplied to the engine controller;
an electrical resistance of the first wire is less than an electrical resistance of the second wire; and
an electrical resistance of the third wire is less than the electrical resistance of the second wire.

11. The vehicle according to claim 9, wherein
the wire harness includes:
   a first wire connecting the steering controller and the connecting point;
   a second wire connecting the engine controller and the connecting point; and
   a third wire connecting the transmission controller and the connecting point;
the current supplied to the transmission controller and the current supplied to the steering controller are each greater than the current supplied to the engine controller;
the first wire is shorter in length than the second wire; and
the third wire is shorter in length than the second wire.

12. The vehicle according to claim 11, wherein a length of the second wire is 1, a length of the third wire ranges from 0.2 to 0.8, and a length of the first wire ranges from 0.1 to 0.4.

13. A vehicle comprising:
a body frame supporting three or more wheels;
an engine attached to the body frame;
a transmission that is attached to the body frame and changes torque from the engine and outputs a resulting torque;
an injector that is disposed on the engine and supplies fuel to the engine;
an engine controller configured or programmed to control the injector; and
a transmission controller configured or programmed to control a gear position of the transmission; wherein
each of the engine controller and the transmission controller is an electric control unit;
the engine controller and the transmission controller are spaced apart from each other; and
a distance between the engine controller and the engine is shorter than a distance between the transmission controller and the engine.

14. The vehicle according to claim 13, further comprising:
a shift actuator that rotates a shift drum of the transmission; and
a clutch actuator that engages and disengages a clutch; wherein
the transmission controller is configured or programmed to output signals to control the shift actuator and the clutch actuator in accordance with an engine speed and a vehicle speed.

15. The vehicle according to claim 13, further comprising:
a front panel of the vehicle; wherein
the transmission controller is disposed inside the front panel.

16. The vehicle according to claim 13, further comprising:
a steering wheel; wherein
the transmission controller is disposed in front of the steering wheel.

17. The vehicle according to claim 13, wherein
the body frame includes a right subframe, a left subframe, and a cross member connected to the right subframe and the left subframe; and
the transmission controller is fixed to the cross member.

18. The vehicle according to claim 13, further comprising a gear position sensor that detects the gear position of the transmission, wherein the transmission controller is configured or programmed to acquire at least gear position information from the gear position sensor.

* * * * *